(12) United States Patent
Newell et al.

(10) Patent No.: US 11,268,021 B2
(45) Date of Patent: Mar. 8, 2022

(54) MULTI-CHROMATIC CAPPED SEMICONDUCTOR NANOCRYSTALS

(71) Applicant: UNIVERSITEIT VAN AMSTERDAM, Amsterdam (NL)

(72) Inventors: Katerina Newell, Amsterdam (NL); Benjamin Bruhn, Amsterdam (NL); Benjamin Brenny, Amsterdam (NL)

(73) Assignee: UNIVERSITEIT VAN AMSTERDAM

( * ) Notice: Subject to any disclaimer, the term of this patent is extended or adjusted under 35 U.S.C. 154(b) by 107 days.

(21) Appl. No.: 16/331,704

(22) PCT Filed: Sep. 8, 2017

(86) PCT No.: PCT/EP2017/072664
§ 371 (c)(1),
(2) Date: Mar. 8, 2019

(87) PCT Pub. No.: WO2018/046704
PCT Pub. Date: Mar. 15, 2018

(65) Prior Publication Data
US 2019/0249079 A1 Aug. 15, 2019

(30) Foreign Application Priority Data
Sep. 8, 2016 (NL) .................................. 2017437

(51) Int. Cl.
*C09K 11/59* (2006.01)
*C09K 11/02* (2006.01)
(Continued)

(52) U.S. Cl.
CPC .............. *C09K 11/59* (2013.01); *C09K 11/02* (2013.01); *B82Y 20/00* (2013.01); *B82Y 40/00* (2013.01)

(58) Field of Classification Search
CPC ......... C09K 11/02; C09K 11/59; B82Y 20/00; B82Y 40/00
See application file for complete search history.

(56) References Cited

U.S. PATENT DOCUMENTS 6,126,740 A * 10/2000 Schulz ...................... C30B 5/00
117/4
6,251,303 B1 * 6/2001 Bawendi ................ B82Y 15/00
252/301.4 R
(Continued)

FOREIGN PATENT DOCUMENTS

EP 2428489 A1 3/2012
WO WO2018046704 A1 3/2018

OTHER PUBLICATIONS

International Search Report and Written Opinion; dated Nov. 14, 2017 for PCT Application No. PCT/EP2017/072664.

*Primary Examiner* — C Melissa Koslow
(74) *Attorney, Agent, or Firm* — Mendelsohn Dunleavy, P.C.

(57) ABSTRACT

Multi-chromatic photoluminescent, oxide-capped semiconductor nanocrystals and methods for forming such semiconductor nanocrystals. The method includes exposing one or more oxide-capped semiconductors, preferably type IV semiconductor nanocrystals, to electron beam radiation, wherein the radiation has an energy between 1 and 30 keV, the radiation introducing color centers in the oxide that exhibit photoluminescence in at least the green band of the visible spectrum.

19 Claims, 7 Drawing Sheets

(51) Int. Cl.
*B82Y 20/00* (2011.01)
*B82Y 40/00* (2011.01)

(56) References Cited

U.S. PATENT DOCUMENTS

| | | | |
|---|---|---|---|
| 6,274,323 B1 * | 8/2001 | Bruchez | B82Y 15/00 435/6.11 |
| 2004/0203311 A1 | 10/2004 | Smith et al. | |
| 2011/0204290 A1 | 8/2011 | Koshida et al. | |
| 2013/0337069 A1 | 12/2013 | Beckman et al. | |

* cited by examiner

MULTI-CHROMATIC CAPPED SEMICONDUCTOR NANOCRYSTALS

FIELD OF THE INVENTION

The invention relates to capped semiconductor nanocrystals, and, in particular, though not exclusively, to oxide- or wide bandgap material capped semiconductor nanocrystals exhibiting substantial photoluminescence in at least the green band of the visible spectrum, multi-chromatic capped semiconductor nanocrystals exhibiting substantial photoluminescence emission in the blue, green and red bands of the visible spectrum and methods of forming capped semiconductor nanocrystals.

BACKGROUND OF THE INVENTION

On the quest for ever more energy-efficient, cost-effective and color-enhancing light emitters for display technologies and LEDs, much research has focused on semiconductor nanocrystals (NCs). Semiconductor nanocrystals generally offer bright emission with high quantum yield that is tunable throughout a wide color range by simple variation of their size that sets their energy level structure.

While some materials like cadmium selenide (CdSe) present a health risk and are subject to legislative bans for the consumer electronics market in certain parts of the world, nanostructured silicon is seen as a promising alternative due to its photo-stability, non-toxicity, biodegradability and abundance of resources. Nevertheless, application of silicon NCs (SiNCs) in commercial technologies is currently hindered by the fact that their properties vary dramatically with surface capping, emission yields are low, and fully balanced emission spectra in the visible are very difficult to obtain.

While hydrogen-capped silicon nanocrystals (H—SiNCs) do exhibit some spectral tunability of photoluminescence (PL) they are prone to oxidation. It is known that formation of oxide defects, in particular silica oxide defects, leads to reduced spectral tunability and radiative rate of light emission, which is inconvenient for applicability of this common and low cost material. The resulting oxide-capped SiNCs (O—SiNCs) show size-tunable emission only for larger NCs emitting in the near-IR.

With decreasing size, their emission becomes dominated by surface related species, switching from a broad red PL band at around 2 eV (620 nm) to a broad blue band at around 2.8 eV (450 nm), skipping the green spectral region completely. A third common type, oxide-free organically-capped SiNCs (C—SiNCs), does show some direct band-gap-like emission properties, but is difficult to prepare at larger sizes that would emit in the green-red spectral ranges.

US2004/0203311 describes method of processing a composite material to tailor white light emission of the resulting composite during excitation. The composite material is irradiated to reduce the size of a plurality of nanocrystals and the number of a plurality of traps in the composite material. By this irradiation process, blue light contribution from the nanocrystals to the white light emission is intensified and red and green light contributions from the traps are decreased.

Hence, there is urgent need in the art for bright, multi-chromatic emitting semiconductor nanocrystals that are suitable for lighting applications, preferably white light lighting applications, and for methods for synthesizing such multi-chromatic Silicon nanocrystals.

SUMMARY OF THE INVENTION

Inventors surprisingly found that controllably introducing additional color centers (i.e. crystallographic defects that exhibit absorption in the visible spectrum) that are not commonly present in capped or shell-coated semiconductor nanocrystals (NCs) leads to advantageous spectral broadening of photoluminescence, especially in the green band of the visible spectrum, resulting in a warmly white color. These color centers are introduced into the shell coating by high-energetic radiation such as electron beam radiation and can be excited via bandgaps in the semiconductor nanocrystal. The resulting photoluminescence spectrum is very similar for different types of oxide-capped silicon nanocrystals (O—SiNCs), independently of their core size, shape or preparation procedure. This shows that the treatment is robust and useful for applications.

It is an objective of the invention to reduce or eliminate at least one of the drawbacks known in the prior art. In a first aspect, the invention may relate to a method for forming one or more photoluminescent (PL), preferably multi-chromatic photoluminescent, capped semiconductor nanocrystals, including exposing one or more capped semiconductor nanocrystals to radiation, preferably electron beam radiation, the radiation being selected to have an energy between 1 and 30 keV, the exposure introducing color centers in a capping layer of the capped nanocrystals, the color centers exhibiting photoluminescence in at least part of a green band of the visible spectrum.

In an embodiment, the radiation may be selected between 5 and 25 keV. In another embodiment, the radiation may be selected between 10 and 20 keV. In an embodiment, the green band may have a PL peak approximately between 500 and 580 nm.

Hence, inventors have surprisingly found that controlled exposure of oxide-capped semiconductor nanocrystals to radiation selected from a predetermined energy range provides a substantial improvement in their visible light photoluminescent properties due to the fact that the radiation introduces color centers that exhibit photoluminescence in the green band of the visible spectrum which is very important for white light applications. This effect is surprising as it is generally known that silica oxide defects in oxide-capped nanocrystals lead to reduced spectral tunability and radiative rate of light emission. The inventors show in this disclosure that the radiation-induced color centers in fact lead to improved photoluminsecent properties of the capped nanocrystals.

In an embodiment, at least part of the nanocrystals comprise a type IV, III-V or a II-VI semiconductor. In an embodiment, the nanocrystals may comprise silicon.

In an embodiment, the capping layer may comprise an oxide. In an embodiment, the oxide may include at least one of $SiO_2$ or a metal oxide such as $Al_2O_3$, $ZnO$, $TiO_2$, $Fe_3O_4$.

In a further embodiment, the capping layer may comprise at least a wide bandgap semiconductor material, preferably a wide bandgap III-V or II-VI compound semiconductor material, more preferably at least a nitride-based wide bandgap semiconductor material (e.g. AlN, GaN, BN), a carbide-based wide bandgap semiconductor material (e.g. SiC, WC) or diamond. In an embodiment, a wide bandgap material may have a bandgap in the order of 2 to 4 eV.

In a further embodiment, the capping layer may include a compositions of the above-mentioned materials, e.g. an oxynitride (e.g. silicon oxynitride) or a oxycarbide (e.g. silicon oxycarbide).

In an embodiment, the one or more capped semiconductor nanocrystals may be exposed for at least 10 seconds to radiation, preferably for at least one minute. In an embodiment, the radiation, preferably e-beam radiation, may have an energy selected between 1 and 30 keV, preferably between 5 and 25 keV, more preferably between 10 and 20 keV.

In an embodiment, the one or more semiconductor nanocrystals have an (average) diameter selected between 1 and 100 nm. In another embodiment, the semiconductor nanocrystals may have an (average) diameter selected between 2 and 10 nm.

In this disclosure inventors show that color centers introduced into capped semiconductor nanocrystals, such as oxide-capped silicon nanocrystals (O—SiNCs) open up new emission bands, in particular a green emission band, that provide these NCs a well-equilibrated white emission spectrum that is optically excitable. Using high energy radiation, such as e-beam irradiation, color centers are generated in the capping layer (e.g. the oxide-shell of the O—SiNCs), exhibiting emission bands that do not naturally occur in these NCs and that are very robust and reproducible. These emission bands, particularly including the missing green band, have similar brightness through the whole visible range, turning the treated SiNCs into a well-equilibrated multi-chromatic emitter that luminesces in a warmly white color.

Because of the smaller band-gap of SiNCs compared to bulk silica, these color sites can be efficiently excited optically. The resulting dramatic widening of the PL emission spectrum towards a warm white color opens up great new opportunities for applications as white LED phosphors that are highly demanded by industry.

In an embodiment, the exposure introduces radiation-induced color centers in the capping layer, the radiation-induced color centers, more preferably e-beam radiation-induced color centers, may provide a photoluminescence (PL) emission in at least one of: a blue band, a green band; and/or, a (visible) red band.

In an embodiment, the bleu band may have a PL peak approximately between 400 and 520 nm; the green band may have a PL peak approximately between 500 and 580 nm; and/or, the red band may have PL peak approximately around 650 nm.

In a further aspect, the invention may relate to one or more photoluminescence capped semiconductor nanocrystals, each semiconductor nanocrystal comprising: a semiconductor nanocrystal core, preferably the core comprising a type IV, III-V or a II-VI semiconductor; and, an capping layer over said semiconductor nanocrystal core, the capping layer comprising color centers, preferably radiation-induced color centers, more preferably e-beam radiation-induced color centers, the color centers providing a photoluminescence emission in at least part of a green band of the visible spectrum.

In an embodiment, the capping layer may comprise an oxide. In an embodiment, the oxide may include at least one of $SiO_2$ or a metal oxide such as $Al_2O_3$, $ZnO$, $TiO_2$, $Fe_3O_4$.

In an embodiment, the capping layer may comprise at least a wide bandgap semiconductor material, preferably a wide bandgap III-V or II-VI compound semiconductor material, more preferably at least a nitride-based wide bandgap semiconductor material (e.g. AlN, GaN, BN), a carbide-based wide bandgap semiconductor material (e.g. SiC, WC) or diamond.

In an embodiment, the color centers, preferably the radiation-induced color centers, may provide a photoluminescence (PL) emission in at least one of: a blue band (having a PL peak approximately between 400 and 520 nm), a green band (having a PL peak approximately between 500 and 580 nm); and/or, a (visible) red band (having a PL peak approximately around 650 nm).

In an embodiment, the one or more semiconductor nanocrystals may have an (average) diameter selected between 1 and 100 nm, preferably between 2 and 10 nm.

In an embodiment, the oxide may be one that is formed by a natural oxidation technique, a chemical (dry or wet) oxidation technique, a thermal oxidation technique, an oxide deposition technique, a low-temperature oxidation technique such as plasma oxidation technique, or any other technique leading to deposition or formation of oxide layer on Si surface.

In an embodiment, at least part of the oxide capping layer may comprise strained oxide, preferably strained silicon oxide or a strained wide bandgap semiconductor material.

In an aspect, the invention may relate to multi-chromatic semiconductor nanocrystals, preferably type IV, III-V or and/or II-VI semiconductor nanocrystals, more preferably silicon nanocrystals, each semiconductor nanocrystal comprising an capping layer, preferably an oxide-capping layer (e.g. a silicon oxide capping layer) or a wide bandgap semiconductor capping layer, the capping layer comprising color centers, preferably radiation-induced color centers, more preferably e-beam radiation-induced color centers, the color centers providing a photoluminescence emission in at least one of: a blue band (having a PL peak approximately between 400 and 520 nm), a green band (having a PL peak approximately between 500 and 580 nm); and/or a (visible) red band (having a PL peak approximately around 650 nm).

In an aspect, the invention relates to multi-chromatic semiconductor nanocrystals, preferably type IV, III-V or and/or II-VI semiconductor nanocrystals, more preferably silicon nanocrystals, each semiconductor nanocrystal comprising an capping layer, preferably an oxide capping layer (e.g. a silicon oxide capping layer) or a wide bandgap semiconductor capping layer, the capping layer comprising color centers, preferably radiation-induced color centers, more preferably e-beam radiation-induced color centers, the color centers providing a photoluminescence emission associated with at least a first (x) CIE coordinate selected between 0.30 and 0.40; and/or, a second (y) CIE coordinate selected between 0.30 and 0.45.

In an embodiment the one or more semiconductor nanocrystals have an (average) diameter selected between 1 and 100 nm, preferably between 2 and 10 nm.

In an embodiment, at least part of the capping layer may comprise strained oxide, preferably strained silicon oxide, or a strained wide bandgap semiconductor material.

In a further aspect, the invention may relate to the use of the one or more semiconductor nanocrystals and/or multi-chromatic semiconductor nanocrystals as described above in a lighting source such as a white lighting source.

Environmental friendly silicon NCs that usually suffer from poor luminescent properties can be made to fluoresce with a well-balanced visible white emission spectrum upon e-beam irradiation. The spectral changes induced by the e-beam irradiation consist of considerable spectra shift and broadening, irrespective of the initial sample characteristic.

Unlike in bulk silica, in nanocrystal systems, these color sites in the capping can be efficiently excited optically due to the narrower band-gap of the host, the nanocrystal. From the comparison of three very different types of O—SiNC samples, it has been found that this effect is independent of the preparation protocol and properties of the NCs. Thus, any oxide-capped SiNC, treated by high-energy radiation energy around 1-30 keV for a short time, e.g. one or more minutes, may be converted into a brightly warm-white light-emitting material. The process thus provides a very robust and reliable way to convert the luminescence of the environmentally friendly and abundant SiNCs to white color, opening the door to numerous lighting applications.

Oxide-capped Si-NCs, the source material, are known for their spectrally limited emission color, which is either in red/near-infrared region and/or in blue. The invention transforms these oxide-capped nanocrystals (Si-NCs) in such a way that they show warm white light emission color under common blue/UV light source. The technique works independently of Si-NC preparation technique, NC core size, shape or crystallinity. White emission can be created independently of the origin/size/shape of the original material (oxide-capped Si-NCs)—hence, any type of oxide-capped Si-NCs can be used with the same output after the treatment.

Our method utilizes simple treatment that modifies this limited emission spectrum of Oxide-capped Si-NCs into a very broad one with a warm white color—a spectrum desired by LED applications for the development of warm white phosphors. The treatment consists of irradiation of the Si-NCs with any electron beam of energy between 1 and 30 keV in vacuum. Such an electron beam can be obtained in most common electron microscopes.

The broadening of emission into the warm white spectrum occurs due to the generation of a number of different silica oxide defects that are generated by the electron beam in the oxide shell surrounding the Si-NC. Such emitting defects have been previously measured and generated in bulk silica oxide, however, in such cases, their emission cannot be effectively excited by the use of blue/UV diode light sources, but a high energy excitation must be used, due to the wide bandgap of silica and small absorption cross-section of the defects. The difference in our material is that defects are on the surface of Si-NCs, which act as absorbing sites that can be effectively excited by the blue/UV diode light source, owing to the narrower bandgap of Si-NCs when compared to silica. Energy is then transferred to the neighboring defects in the silica shell, which emit in a very broad spectral range, leading to the warm white emission appearance.

The invention will be further illustrated with reference to the attached drawings, which schematically will show embodiments according to the invention. It will be understood that the invention is not in any way restricted to these specific embodiments.

DETAILED DESCRIPTION

In bulk and nanostructured silica (SiO2), absorption and emission can be achieved through defects, created under strain, irradiation, or at interfaces, known as a color centers. The most common types, contributing in the visible spectral range with bright blue, green and red bands, are depicted in FIG. 1.

In stoichiometric bulk SiO2, each Si atom binds covalently to four O atoms and each O atom to two Si atoms, with flexible angular conformation and high binding energy (4.5 eV). When these binding configurations change, defects are created that can provide luminescent recombination pathways with characteristic emission spectra (for more details, see supplementary material). In silica, however, these emission spectra can only be efficiently excited by high-energy photons or electron beam due to the large band gap of the silica host, precluding their use in lighting applications.

Figure 1:
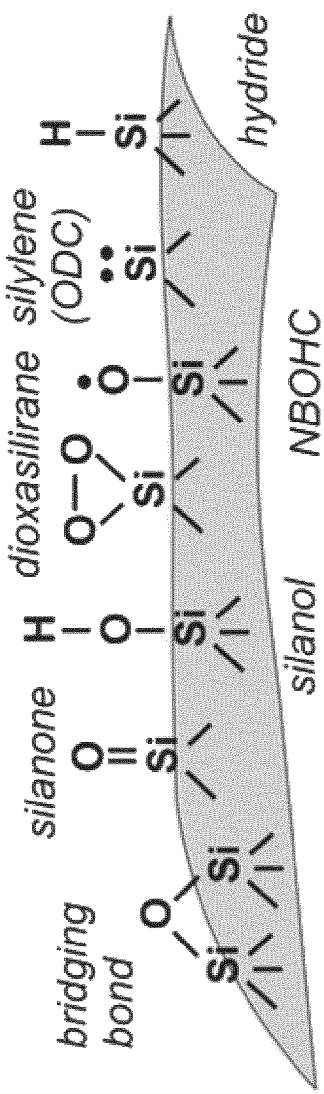
FIG. 1 depicts color centers observed in bulk and nanostructured silica.

FIG. 1 depicts color centers observed in bulk and nanostructured silica (silicon-oxide) including (from left to right) bridging =Si—O—Si= bond, silanone =Si=O, silanol =Si—OH and its derivatives dioxasilirane =Si(O2), silylene =Si•• (also known in bulk silica as oxygen-deficiency center, ODC, non-bridging oxygen hole center (NBOHC) =Si—O•, and Si-hydride Si—H. Red ~650 nm (~1.9 eV) emission is most often ascribed to non-bridging oxygen hole centers (NBOHC) =Si—O•, where one of the O—Si bonds is broken. The blue ~460 nm (~2.7 eV) emission has been related to silanol groups =Si—OH, or to their derivative silylene =Si••, also known as oxygen-deficiency center ODC in bulk silica. The green ~550 nm (2.25 eV) emission band is of relatively unclear origin in damaged bulk Si-rich silica. In nanostructured silica, the interpretation involves an unstable silanone =Si=O bond. Possible are also not very stable hydride =Si—H species.

Figure 2:
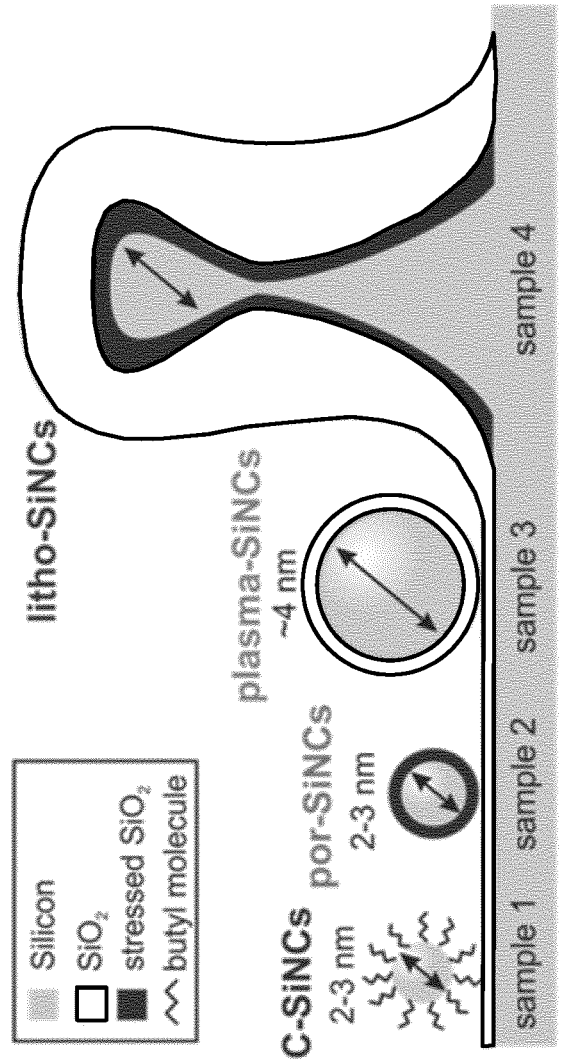
FIG. 2 depicts four types of Silicon nanocrystals that were studied in this disclosure.

FIG. 2 depicts the four types of SiNCs that were studied in this disclosure. The samples include organically-capped oxide-free silicon nanocrystals (C—SiNCs), porous silicon oxide-capped nanocrystals (por-SiNCs), plasma-synthesized oxide-capped silicon nanocrystals (plasma-SiNCs) and oxide-capped silicon nanocrystals made made by e-beam lithography (litho-SiNCs). The C-SiNCs served as a reference. The samples differ in the NC core size, surface capping and strain, allowing to elucidate the origin and robustness of the induced spectral changes.

An overview of the different samples and their characteristics is provided in table 1:

TABLE 1

| | | Four types of studied SiNCs samples. | | | |
|---|---|---|---|---|---|
| Sample | NC type | capping | Diameter (nm) | distribution | preparation |
| 1 | C-SiNCs | Organic (alkyl) | 2.2 ± 0.5 | ensemble | Wet-chemical synthesis |
| 2 | Por-SiNCs | Naturally grown thin silica oxide | 2-3 | ensemble | Electro-chemical etching |
| 3 | Plasma-SiNCs | Naturally grown thin silica oxide | ~4 | ensemble | Plasma synthesis |
| 4 | Litho- | Strained | ~4 | Single NC | Electro |

TABLE 1-continued

Four types of studied SiNCs samples.

| Sample | NC type | capping | Diameter (nm) | distribution | preparation |
|---|---|---|---|---|---|
| | SiNCs | thick silica oxide | | | beam lithography |

The oxide-free organically capped nanocrystals (C—SiNC, sample 1) are prepared by a wet-chemical synthesis and have small core of diameter of 2.2±0.5 nm and surface passivated by butyl ligands. Details on the synthesis method for the C-SiNCs can be found in the article by K. Dohnalova, A. N. Poddubny, A. A. Prokofiev, W. D. A. M. de Boer, C. P. Umesh, J. M. J. Paulusse, H. Zuilhof, and T. Gregorkiewicz, Light Sci. Appl. 2013, 2, e47.

The studied oxide-capped nanocrystals (O—SiNCs) differ largely in size, preparation protocol and oxide-capping thickness and quality. Por-SiNC (Sample 2), consists of small NCs with diameter of 2-3 nm that are made from mechanically pulverized layers of oxidized porous silicon that has been additionally post-etched in hydrogen peroxide solution, leading to increased amounts of —OH surface moieties. Details on the synthesis method for the Por-SiNCs can be found in the article by K. Dohnalova, L. Ondic, K. Kusova, I. Pelant, J. L. Rehspringer, and R.-R. Mafouana, J. Appl. Phys. 2010, 107, 053102.

Plasma-SiNCs are larger NCs with core diameter of around 4 nm, prepared by plasma synthesis from silane gas. The NC is naturally oxidized by exposure to air, which results in thin thermal oxide layer. Details on the synthesis method for the Plasma-SiNCs can be found in the article by I. Dogan, N. J. Kramer, R. H. J. Westermann, K. Dohnalova, A. H. M. Smets, M. A. Verheijen, T. Gregorkiewicz and M. C. M. van de Sanden, J. Appl. Phys. 2013, 113, 134306.

The Litho-SiNCs are also larger Si nanostructures, some of them similarly sized as those of the plasma-SiNC sample, which were chosen for this study. These samples were prepared by electron-beam lithography followed by reactive ion-etching and self-limiting oxidation. This oxidation technique results in SiNCs embedded in a thick strained thermal oxide as indicated in the sketch in FIG. 2. Details on the fabrication method for the litho-SiNCs can be found in the article by B. Bruhn, F. Sangghaleh and J. Linnros, Phys. Status Solidi A, 2011, 208, 3, 631-634. The above-mentioned articles describing the details on the synthesis of the NCs listed in table 1 are herewith incorporated by reference into this disclosure.

All colloidal nanocrystals (por-, plasma- and C—SiNC samples) were dispersed and sonicated in UV-grade ethanol and deposited onto a clean pre-patterned silicon surface. The patterned substrate allowed recognition and analysis of the same sample area in the PL and CL measurements. Silicon substrates are covered with a naturally grown thin oxide layer that exhibits negligible PL and CL signals, but is sufficiently conductive. For better contrast, the weakly emitting plasma-SiNCs were also deposited onto a glass substrate partially covered by a thin gold sheet. It was confirmed that this change of substrates had no influence on the emission spectrum.

As shown in table 1, samples 1 and 2 have similar core size, but different capping in capping (organic vs. oxide); samples 2 and 3 have similar capping, but different size (~2.5 nm vs. ~4 nm); samples 3 and 4 have similar sizes, but their silica shells differ in thickness, strain and interface quality (natural thin oxide vs. strained thick thermal oxide).

Another difference concerns the measurements: while the measurements of samples 1-3 represent ensemble measurements, the measurements of sample 4 represent single-nanoparticle measurements due to the extremely low concentration of the NCs in these samples.

These largely different samples provide evidence of the generic advantageous effect of e-beam irradiation on the emission spectra of the SiNCs.

To investigate the generation of color centers in the oxide shell of the O—SiNCs, emission spectra were studied before, during, and after e-beam irradiation. During this process, photoluminescence (PL) micro-spectroscopy and cathodoluminescence (CL) micro-spectroscopy were used for sample characterization.

Figure 3:
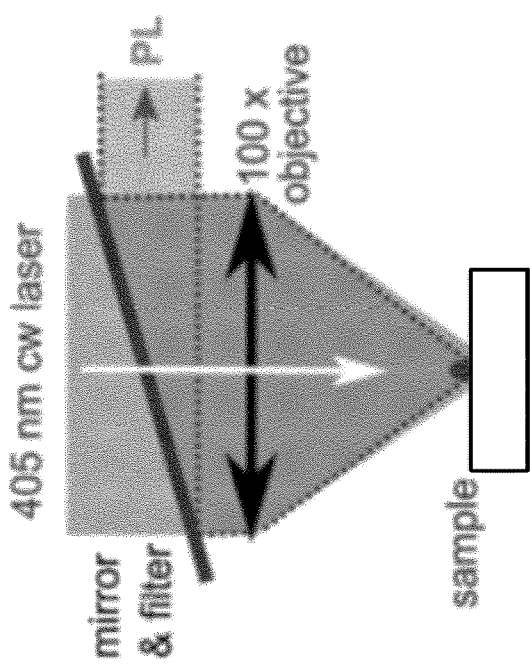
FIG. 3 depicts a schematic of a photoluminescence microscopy setup.

FIG. 3 depicts a schematic of a well-known PL microscopy setup that was used in the analyses of the samples. Steady-state PL was measured using an inverted wide-field optical microscope (Zeiss AxioVert XY) with 100× air objective (NA 0.7). The PL was excited by a 405 nm cw laser diode and detected by a liquid-nitrogen cooled CCD camera (Pylon 400B, Princeton Instruments) coupled to a spectrometer (Acton SP2300, Princeton Instruments). PL spectra were measured at room temperature and ambient conditions and corrected for spectral response of the detection system.

Figure 4:
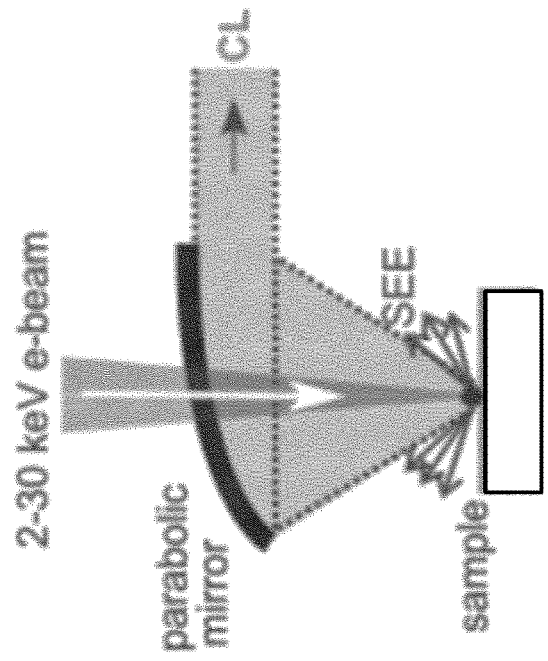
FIG. 4 depicts a schematic of a cathodoluminescence microscopy setup.

FIG. 4 depicts a schematic of a well-known CL microscopy setup. The CL measurements were performed in the vacuum chamber of a scanning electron microscope (SEM) (FEI XL-30 SFEG). Samples were irradiated by a focused e-beam of smallest diameter of ~2 nm, electron energies in range of 1-30 keV and beam currents of 0.2-400 nA/s, to generate color centers in the silica oxide capping layer of the SiNCs and excite the CL emission. The beam scanning mode typically covered an area of approximately 100 $nm^2$, large enough to treat sufficiently large areas to get enough signal in the follow-up PL measurements. Instead of a focused e-beam, the samples may be irradiated using unfocussed (e-beam) radiation. In that case larger areas may be irradiated in one exposure run.

The CL signal is collected by a parabolic mirror and deflected into a liquid-nitrogen-cooled front-illuminated CCD camera (Spec-10 100F, Princeton Instruments), coupled to a spectrometer (Acton SP2300, Princeton Instruments). CL has been measured under various exposure times and varying electron energies at room temperature and has been corrected for the spectral response of the detection system.

Figure 5:
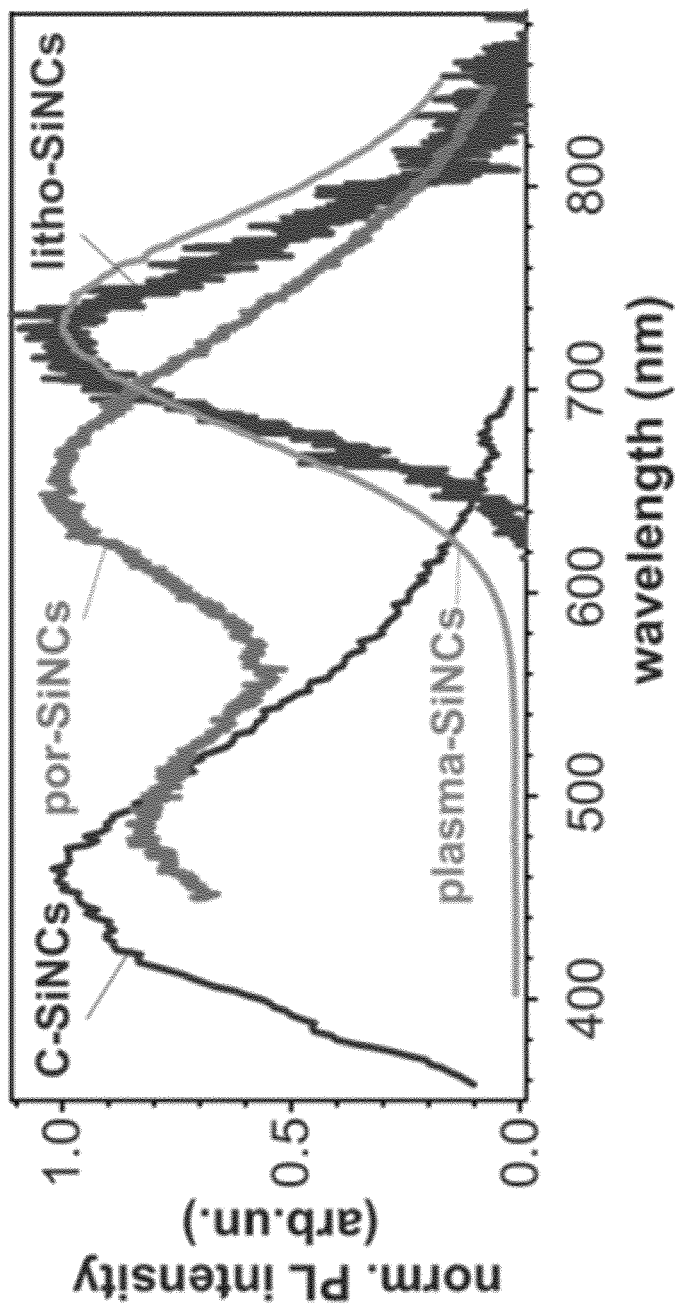
FIG. 5 depicts emission spectra of four types of Silicon nanocrystals that were studied in this disclosure.

FIG. 5 depicts normalized PL spectra from the four types of SiNCs samples before e-beam irradiation. The intensities are not to be directly compared due to different emission efficiencies and SiNCs concentrations in the studied samples. As shown in this FIG., oxide-free C-SiNCs exhibit strong emission at around 460 nm due to band-to-band excitonic recombination. The por-SiNCs shows two equally strong oxide-related bands at 480 nm and 650 nm related to silica oxide capping. The plasma-SiNCs and litho-SiNCs are both larger in core size and both show intrinsic PL around 720 nm. For litho-SiNCs the PL signal is weaker, because it is measured from a single SiNC emitter.

To optimize the electron energy in the CL measurements for the highest (optimum) signal, the CL intensity as function of electron energy was studied. Higher energies lead to deeper penetration of the e-beam into the Si substrate, decreasing the efficiency of excitation of the SiNC structures. Indeed, the intensity changes significantly upon varying the electron energy, while the spectral shape remains rather constant.

Figure 6:
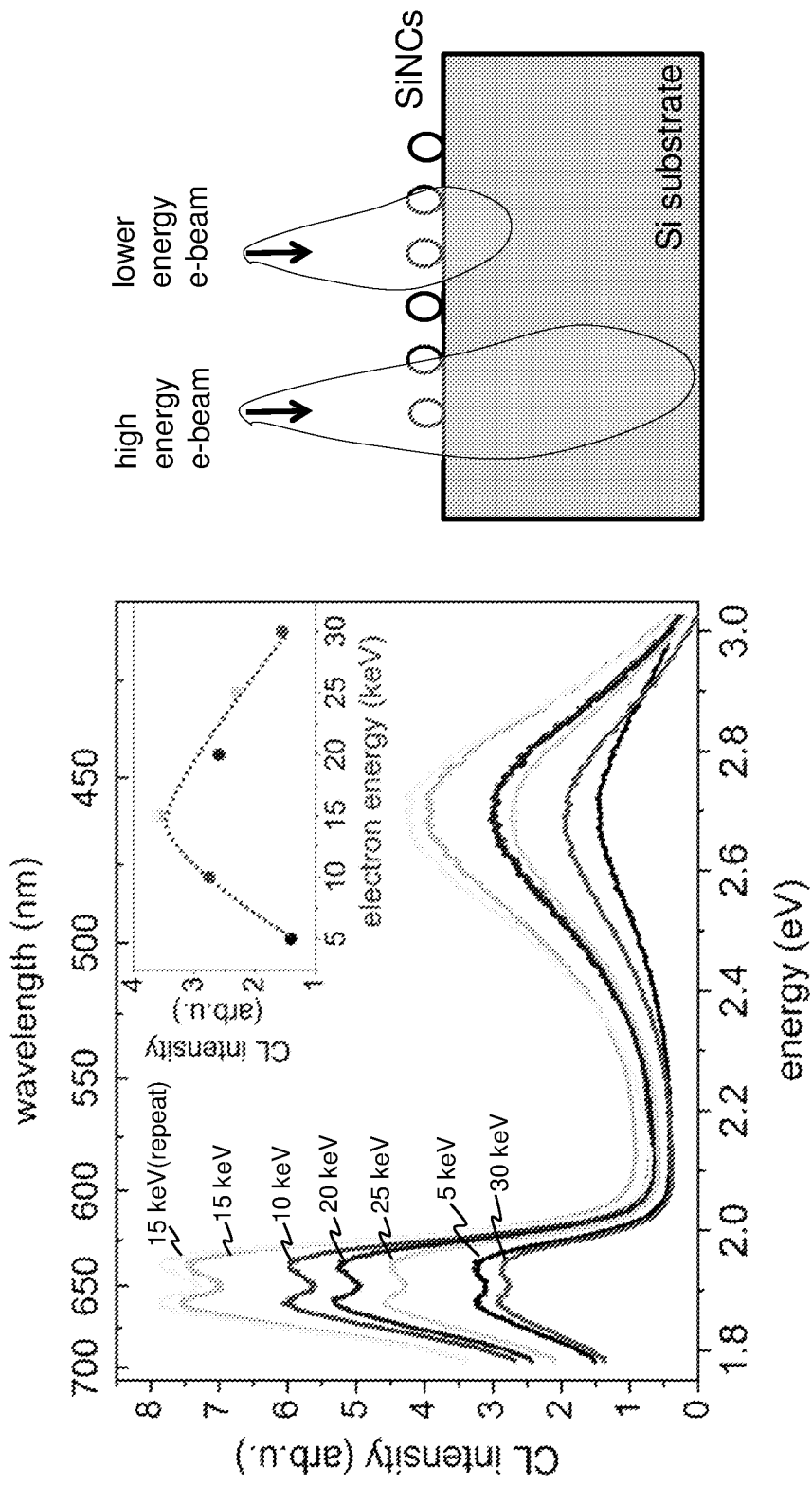
FIG. 6 depicts excitation spectra for porous Silicon nanocrystals for different electron beam energies. The inset of FIG. 6 shows a graph of the electron enemy in the range of 5-30 keV versus the CL intensity.

FIG. 6 depicts excitation spectra for por-SiNCs for different electron beam energies. The studied excitation spectra show that good excitation spectra are obtained for electron beam energies between 10 and 20 keV, as shown by the graph in the inset of FIG. 6. The inset of FIG. 6 further shows that optimal excitation was obtained for energies around 15 keV. Difference in electron energy can originate from the different thickness of the SiNC layers. The por-SiNCs as well as the plasma-SiNCs combine into larger agglomerates, which may have dimensions up to 1 micrometer. The Litho-SiNCs are expected to have similar properties.

Figures 7A, 7B:
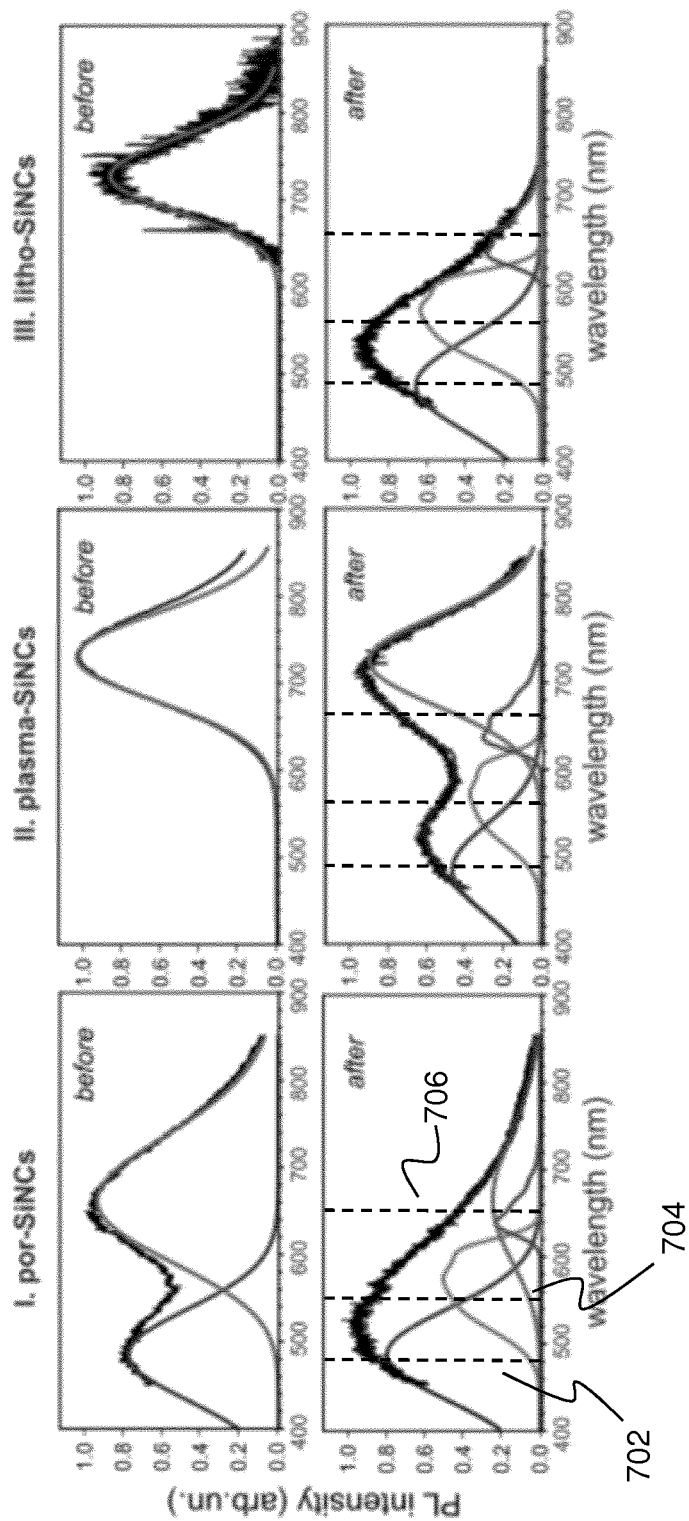
FIGS. 7A and 7B depict photoluminescence emission spectra of oxide-capped Silicon nanocrystals taken before and after e-beam irradiation.

FIGS. 7A and 7B depict PL emission spectra of oxide-capped O—SiNCs taken before (FIG. 7A) and after (FIG. 7B) e-beam irradiation. The PL spectra before e-beam irradiation reveal the expected absence of green (por-SiNCs) and the complete absence of green-blue emission (plasma-SiNCs and litho-SiNCs). The apparent differences in the spectra reflect the different core size and surface capping of the SiNCs associated with their different preparation.

Strikingly, after the e-beam irradiation, very different PL spectra with much enhanced green-blue emission are observed for all O—SiNCs, as shown in FIG. 7B. Irrespective of their different initial spectra, all samples feature three new emission bands: a bright blue band at around 480 nm, a bright green band at 550 nm, and a visible narrow red band at 650 nm in addition to the original red/near infrared emission band (positions are indicated by the dotted lines 702 (blue), 704 (green) and 706 (visible red)), broadening the spectrum towards the visible. As shown in this FIG., the PL intensity of the radiation-induced green band peak for the plasma synthesized O—SiNCs is at least of similar height as the blue and/or red-band.

Figures 8A, 8B:
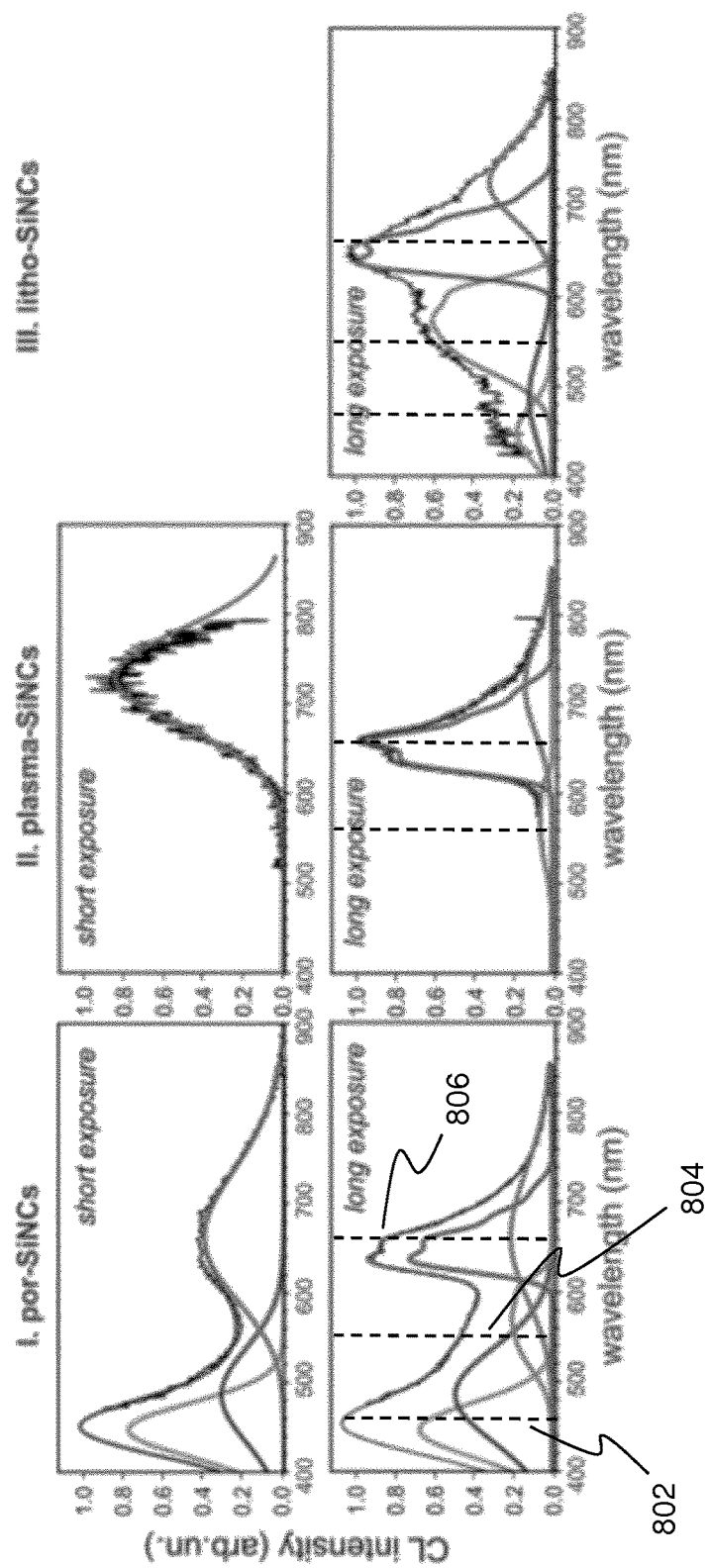
FIGS. 8A and 8B depict CL spectra during e-beam exposure.

FIGS. 8A and 8B depict CL spectra during e-beam exposure. The lines below the measured spectra represent fits of the contributing bands including the original PL bands and the created color centers emitting in red, green and blue spectral ranges (denoted by the dotted lines). To investigate the spectral changes in more detail, the development of the CL spectra during the e-beam irradiation was examined. Here a 15 keV electron energy was used.

The short exposures (in the order of a few seconds) probed the CL spectra of the samples, while leaving their emission spectra unchanged, as shown in FIG. 8A. In contrast, the long exposures (in the order of a few minutes or more) lead to strong changes in the emission spectra, eventually resulting in very different spectral characteristics, as shown in FIG. 8B. It is noted that the short exposure CL data were not possible to retrieve for the litho-SiNC, due to the single nanocrystal nature of the measurement. After the treatment, samples were removed from the SEM vacuum chamber, and their PL was studied at ambient atmosphere.

Already after a few minutes of e-beam exposure, the CL spectra of the O—SiNCs show new emission bands—a narrow red band appears at around 650 nm (dotted line 806), a green emission band at around 550 nm (dotted line 804), and a blue band appears at around 460 nm (dotted line 802) (except for the plasma-SiNCs). In stark contrast to the O—SiNCs, the reference oxide-free C-SiNCs sample does not show any change upon irradiation. Also, the reference silicon substrate with a native silica layer does not show any emission altogether. Hence, it is concluded that the new spectral features are related to the presence of the silica oxide shell on the O—SiNCs.

To follow the spectral evolution of the emission bands quantitatively, the PL and CL spectra were fit with a fixed set of emission peaks with constant full width of half maximum (FWHM) and peak position, adjusting only their relative amplitudes. The peak parameters are retrieved from the best available measurements for the blue, green and red bands, while for the original PL bands, the data of FIG. 5 were used. As shown in FIG. 5-8, all the observed PL and CL spectra can be described from the superposition of just five spectral contributions.

The robustness of these spectral features indicates constant underlying mechanisms. A close look at the characteristic spectral profile shows that all the emerging spectral features can be related to color centers that are known from bulk silica. The very bright narrow red 650 nm band that contributes significantly in all samples is likely related to the silica NBOHC color center (see also FIG. 1), as is evident from its characteristic double-peak feature, which has been assigned to the two possible conformations of the NBOHC in the presence of the Si—OH bond. In the final PL spectra, this band is less intense, which is expected due to its reduced excitation cross-section at 3 eV. The green CL band at 550 nm has never been reported in any native form of O—SiNCs.

From the spatially resolved, single-nanocrystal study on litho-SiNCs, it is concluded that an Si-rich environment is important, as well as the presence of strain, as the green band consistently shows up only at the Si-rich center of the Si nano-wall, but not at all at the silica-rich sides of the wall, and it is the brightest in the litho-SiNCs that exhibit the thickest and the most strained silica shell of all the studied samples. It might be possible that green color centers like =Si—H and =Si=O that are unstable on the surface of the nanostructured silica, are stabilized here within the oxide shell of the SiNCs.

Finally, the blue emission band at 450-480 nm may be of the same origin as those of the oxygen deficiency centers (silylene in FIG. 1). It likely results from already existing oxide centers, as it appears to be already present in one of the as-grown samples (por-SiNCs). Such oxygen deficiency centers can appear as a result of reactions between neighboring silanol =Si—OH groups following the reaction scheme [≡Si—O—H+H—O—Si≡↔ODC+H2].

Indeed, Si—O—H groups are abundant on the surface of the por-SiNC sample due to a specific post-etch procedure in hydrogen peroxide. By comparing the original PL with the short-exposure CL spectra, it is concluded that no new centers are formed. The slight blue-shift of the blue band in the CL compared to the PL can be caused by the different excitation energies, as the blue PL band has been reported to shift under different optical excitation energies.

Figure 9:
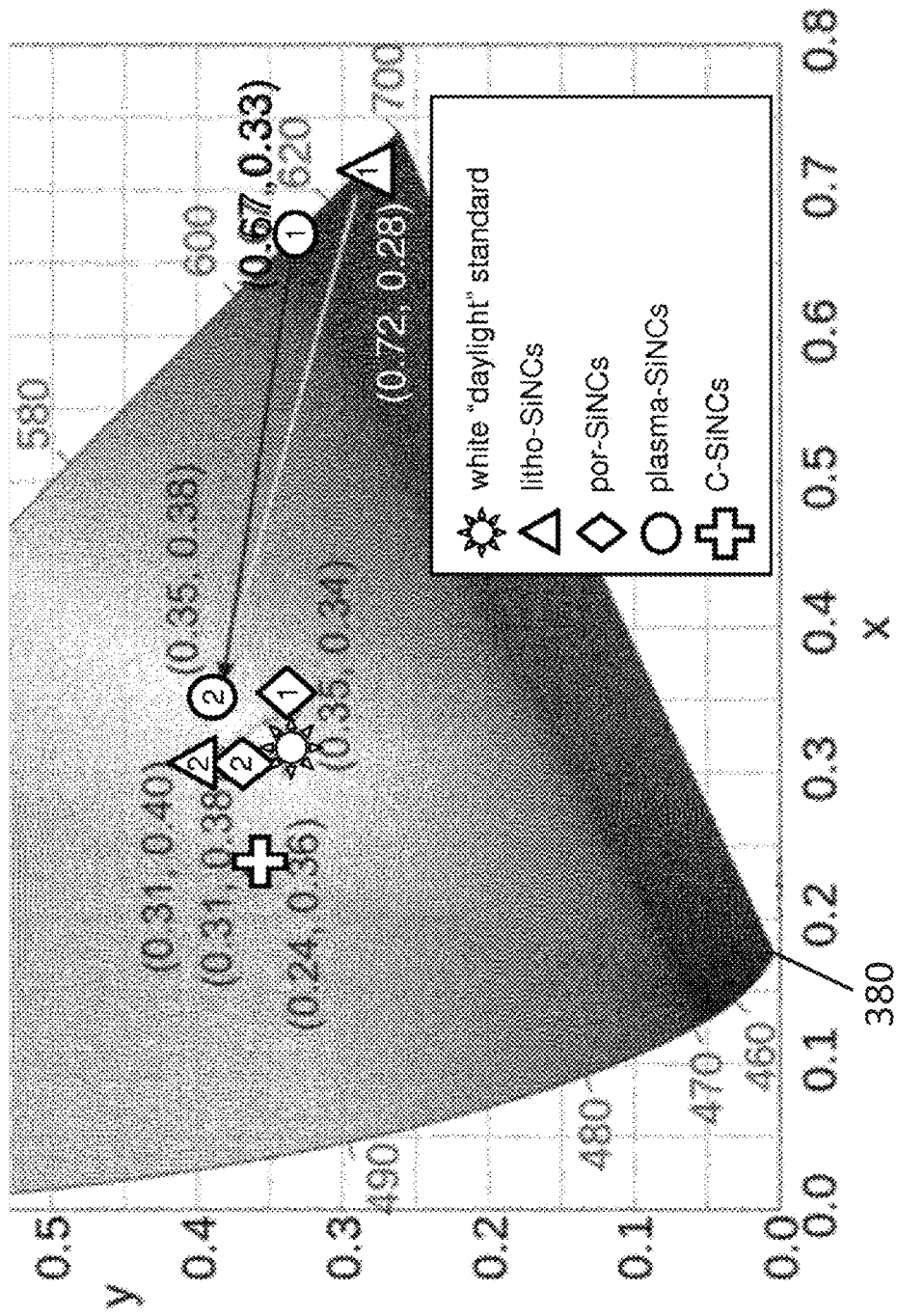
FIG. 9 depicts a color gamut chart summarizing the spectral changes introduced by the e-beam treatment according various embodiments of the invention.

FIG. 9 depicts a color gamut chart summarizing the spectral changes introduced by the e-beam treatment according various embodiments of the invention. CIE coordinates are shown for each sample in the graph and arrows indicate the shift for each sample induced by the e-beam treatment (For the C-SiNCs the position does not change, because irradiation did not lead to any spectral modifications). For comparison, also white standard D65 is inserted in the graph with CIE coordinates 0.329, 0.340). For the color gamut evaluation, CIE 1931 standard was used.

As a result of the irradiation, all O—SiNCs change their spectral coordinates to very similar end chromatic coordinates associated with the introduced red, green and blue color centers. As shown by this FIG., in an embodiment, the radiation-induced color centers may provide a photoluminescence associated with a first (x) CIE coordinate selected between 0.30 and 0.40. In another embodiment, the radiation-induced color centers may provide a photoluminescence associated with a second (y) CIE coordinate selected between 0.30 and 0.45. In an another embodiment, radiation-induced color centers may provide a photoluminescence close to or approximately equal to the white standard D65. The resulting PL emission of all irradiated samples appears warmly white to the eye, with the warmest white obtained for the originally near-infrared emitting plasma-SiNC.

This is different from the reference oxide-free C—SiNC, whose chromatic coordinates do not change by the irradiation, remaining cold blue-white due to lack of oxide and hence oxide-related color sites. The por-SiNC sample, as discussed before, shows whitish PL already in its native state, but also here the introduction of the missing green emission band results in a better defined white color. The most pronounced spectral changes from far-red to white color, however, occur for the plasma- and litho-SiNC samples. For the latter, the single-nanocrystal measurements indicate that the broad emission spectrum is indeed a single-nanocrystal property, and not an ensemble effect. Interestingly, this identifies even a single nanocrystal as a multi-chromatic luminescent emitter with white spectral profile that is of interest for white LED applications.

Hence, color centers similar to those in silica bulk materials are formed in the silica-oxide shell of the O—SiNCs. However, unlike in bulk silica, their PL emission can be efficiently excited optically at 405 nm due to the comparably much narrower bandgap of the nanocrystals.

Although the examples described in this application are described with reference to NCs an silicon oxide capping layer, it is apparent that the invention may also be used with other capping materials. For example, the capping material may include $SiO_2$, $Al_2O_3$, ZnO, $Fe_3O_4$. Such oxides may be native-grown or thermally formed oxide. Alternatively, such oxide may be grown using a suitable fabrication process.

Further, the capping material may include large or wide bandgap semiconductor materials, preferably wide bandgap III-V and II-VI compound semiconductor materials. In an embodiment, wide bandgap semiconductor materials may include at least one of nitride-based wide bandgap semiconductor material, e.g. AlN, GaN, BN, or a carbide-based wide bandgap semiconductor material, e.g. SiC, WC, or diamond.

It is to be understood that any feature described in relation to any one embodiment may be used alone, or in combination with other features described, and may also be used in combination with one or more features of any other of the embodiments, or any combination of any other of the embodiments. The invention is not limited to the embodiments described above, which may be varied within the scope of the accompanying claims.

The invention claimed is:

1. A method for forming one or more photoluminescent, capped semiconductor nanocrystals comprising a step of:
exposing one or more capped semiconductor nanocrystals to radiation to introduce color centers that exhibit photoluminescence in at least part of a green band of the visible spectrum, in a capping layer of the capped semiconductor nanocrystals, the capping layer comprising an oxide or a wide bandgap semiconductor material, the radiation being selected to have an energy between 1 and 30 keV.

2. The method according to claim 1, wherein at least part of the capped semiconductor nanocrystals comprises a type IV, III-V or II-VI semiconductor.

3. The method according to claim 2, wherein the oxide comprises an oxide selected from the group consisting of $SiO_2$, $Al_2O_3$, ZnO, $TiO_2$ and $Fe_3O_4$.

4. The method according to claim 1, wherein in the exposing step, the one or more capped semiconductor nanocrystals are exposed for at least 10 seconds to electron beam radiation.

5. The method according to claim 1, wherein the one or more semiconductor nanocrystals have an average diameter between 1 nm and 100 nm.

6. The method according to claim 1, wherein the oxide is formed by at least one of: a natural oxidation technique, a chemical (dry or wet) oxidation technique, a thermal oxidation technique, an oxide deposition technique and a plasma oxidation technique.

7. The method according to claim 1, wherein color centers provide a further photoluminescence (PL) emission in at least one of: a blue band having a PL peak approximately between 400 and 520 nm; and, a visible red band having a PL peak approximately around 650 nm, or the photoluminescence emission in the green band has a PL peak approximately between 500 and 580 nm.

8. The method according to claim 1, wherein the wide bandgap semiconductor material is selected from the group consisting of a wide bandgap III-V semiconductor material and a wide bandgap II-VI compound semiconductor material.

9. One or more photoluminescence capped semiconductor nanocrystals, each of the one or more semiconductor nanocrystals comprising:
a semiconductor nanocrystal core; and,
an capping layer over said semiconductor nanocrystal core, the capping layer comprising an oxide or a wide bandgap semiconductor material, and the capping layer further comprising color centers, the color centers providing a photoluminescence emission in at least part of a green band of the visible spectrum.

10. The one or more photoluminescence capped semiconductor nanocrystals according to claim 9, wherein the color centers provide a further photoluminescence (PL) emission in at least one of: a blue band having a PL peak approximately between 400 and 520 nm, or a visible red band having a PL peak approximately around 650 nm, or the photoluminescence emission in the green band has a PL peak approximately between 500 and 580 nm.

11. The one or more photoluminescence capped semiconductor nanocrystals according claim 9, wherein the one or more semiconductor nanocrystals have an average diameter between 1 and 100 nm.

12. The one or more photoluminescence capped semiconductor nanocrystals according to claim 9, wherein the capping layer comprises an oxide and the oxide is provided by a natural oxidation technique, by a dry or wet chemical oxidation technique, a thermal oxidation technique, an oxide deposition technique, a low-temperature oxidation technique.

13. The one or more photoluminescence capped semiconductor nanocrystals according to claim 9, wherein the oxide of the capping layer comprises strained oxide.

14. Multi-chromatic semiconductor nanocrystals comprising a capping layer, the capping layer comprising an oxide or a wide bandgap semiconductor material, the capping layer further comprising color centers, the color centers provide a photoluminescence emission selected from the group consisting of:
a) a photoluminescence emission in at least one of: a blue band having a PL peak approximately between 400 and 520 nm, a green band having a PL peak approximately between 500 and 580 nm; and a visible red band having a PL peak approximately around 650 nm, and b) a photoluminescence emission associated with a first (x) CIE coordinate selected between 0.30 and 0.40, a second (y) CIE coordinate selected between 0.30 and 0.45 or both a first (x) CIE coordinate selected between 0.30 and 0.40 and a second (y) CIE coordinate selected between 0.30 and 0.45.

15. The multi-chromatic semiconductor nanocrystals according to claim 14, wherein the color centers provide a photoluminescence emission associated with a first (x) CIE coordinate selected between 0.30 and 0.40, a second (y) CIE coordinate selected between 0.30 and 0.45 or both a first (x) CIE coordinate selected between 0.30 and 0.40 and a second (y) CIE coordinate selected between 0.30 and 0.45.

16. The multi-chromatic semiconductor nanocrystals according to claim 14, wherein the one or more semiconductor nanocrystals have an average diameter between 1 and 100 nm.

17. The multi-chromatic semiconductor nanocrystals according to claim 14, wherein the oxide of the capping layer is a strained oxide.

18. A lighting source comprising the one or more semiconductor nanocrystals according to claim 9.

19. A lighting source comprising the multi-chromatic nanocrystals according to claim 14.

* * * * *